United States Patent [19]

Mitchell et al.

[11] Patent Number: 4,965,720
[45] Date of Patent: Oct. 23, 1990

[54] DIRECTED ADDRESS GENERATION FOR VIRTUAL-ADDRESS DATA PROCESSORS

[75] Inventors: Glen R. Mitchell, Pine Island; Richard G. Mustain, Rochester; Jon H. Peterson, Rochester; Lawrence D. Whitley, Rochester, all of Minn.

[73] Assignee: International Business Machines Corporation, Armonk, N.Y.

[21] Appl. No.: 393,046

[22] Filed: Aug. 8, 1989

Related U.S. Application Data

[63] Continuation of Ser. No. 221,004, Jul. 18, 1988, abandoned, which is a continuation of Ser. No. 610,366, May 15, 1984, abandoned.

[51] Int. Cl.[5] .......................... G06F 7/00; G06F 9/00; G06F 9/10
[52] U.S. Cl. .................................................. 364/200
[58] Field of Search ............................ 364/200, 900

[56] References Cited

U.S. PATENT DOCUMENTS

| | | | |
|---|---|---|---|
| 3,725,874 | 4/1973 | Van Heel | 364/200 |
| 3,938,100 | 2/1976 | Steiner | 364/200 |
| 3,949,378 | 4/1976 | Crabb et al. | 364/200 |
| 3,970,999 | 7/1976 | Elward | 364/200 |
| 3,976,976 | 8/1976 | Khosharian | 364/200 |
| 4,037,211 | 7/1977 | Ikuta et al. | 364/200 |
| 4,037,215 | 7/1977 | Birney | 364/200 |
| 4,077,060 | 2/1978 | Bodner et al. | 364/200 |
| 4,089,051 | 5/1978 | Lee, Jr. et al. | 364/200 |
| 4,092,715 | 5/1978 | Scriver | 364/200 |
| 4,093,986 | 6/1978 | Bodner et al. | 364/200 |
| 4,128,875 | 12/1978 | Thurber et al. | 364/200 |
| 4,296,468 | 10/1981 | Bandoh et al. | 364/200 |
| 4,361,868 | 11/1982 | Kaplinsky | 364/200 |
| 4,376,297 | 3/1983 | Anderson et al. | 364/200 |
| 4,393,443 | 7/1983 | Lewis | 364/200 |
| 4,395,754 | 7/1983 | Feissel | 364/200 |
| 4,453,230 | 6/1984 | Mizoguchi et al. | 364/900 |
| 4,466,056 | 8/1984 | Tanahashi | 364/200 |
| 4,481,573 | 11/1984 | Fukunaga et al. | 364/200 |
| 4,571,671 | 2/1986 | Burns et al. | 364/200 |
| 4,615,006 | 9/1986 | Hirano | 364/200 |
| 4,797,814 | 1/1989 | Brenza | 364/200 |
| 4,860,192 | 8/1989 | Sachs et al. | 364/200 |
| 4,868,738 | 9/1989 | Kish et al. | 364/200 |

*Primary Examiner*—Andrew J. James
*Assistant Examiner*—Viet Q. Nguyen
*Attorney, Agent, or Firm*—J. Michael Anglin

[57] ABSTRACT

In a processor having a real address space larger than its virtual address space, all of the physical memory is addressed by using a separate prefix register associated with each of the address registers to hold both a high-order address portion and a control bit specifying whether the address is to be translated or used as a direct real address.

4 Claims, 2 Drawing Sheets

DIRECTED ADDRESS GENERATION FOR VIRTUAL-ADDRESS DATA PROCESSORS

This is a continuation of copending application Ser. No. 221,004 filed on July 18, 1988.

BACKGROUND OF THE INVENTION

The present invention relates to electronic data processors, and more specifically concerns hardware for providing both direct and translated addresses to a memory.

In most data processing systems having virtual memory addressing, the virtual address space is far larger than the real address space of the physical memory. For example, the instruction set of a processor may have 32-bit address fields, allowing up to 4 gigabytes (4GB) of memory to be logically addressed; but the hardware may provide only 24 bit lines, so that only 16 megabytes (16MB) of real memory can be physically addressed. Dedicated hardware then translates each logical address to a real address. If the logical address is not present in the physical main memory, a new page is fetched from a mass storage device into the main memory. That is, virtual memory is normally used to increase the apparent size of the physical main memory of a processor.

A different situation arises when virtual memory is used for the purpose of emulating the architecture of an older processor on newer hardware. Here, the virtual address space of the older architecture may be considerably smaller than the real address space of the physical memory which can actually be installed in the machine. In the specific example to be discussed, the virtual space has 16 bits, accommodating only 64 kilobytes (64KB), while the real space has 21 bits, for 2MB.

The latter case creates a problem of actually reaching all of the physical memory with a real address from within the confines of the instruction set of the older architecture. That is, there are times when the older instruction set must be able to access certain absolute locations in real memory with a direct address, for reading system information or for other purposes.

Conventional approaches for distinguishing between translated and real addresses do not provide feasible ways to provide such direct addresses in this situation.

Most of the conventional approaches are designed for the situation in which the virtual space is larger than the real space. U S. Pat. No. 4,128,875 (Thurber, et al.), for instance, uses a "mode identifier" bit in an address itself to distinguish between these two types of address. This bit, however, is part of the address only when stored in an instruction; in the present situation, the instructions have no room for such extra baggage. The Data General Nova 1200 minicomputer uses a bit in addresses stored in memory to differentiate between direct and indirect addresses. But an older architecture is unlikely to have left room for such extensions. The IBM System/38 has a "virtual equals real" capability in which a normally translated address indicates within itself that it is instead to be treated as an actual real address. Again, this feature requires that the virtual space be larger than the real space; it merely dedicates certain specific combinations of 27 high-order bits to cause the hardware to use the low-order 21 bits of a 48-bit address as a real address in a 2MB physical memory.

Techniques such as bank switching and segmented addressing have been used, especially in microprocessor-based systems, to increase the real memory size beyond the limit imposed by the number of address lines or instruction width in the microprocessor, which then becomes a kind of virtual space within a larger real space. In such cases, however, translated addresses either have not been used or have not been distinguished from real or direct addresses. In the Intel 8088 microprocessor, for instance, the (virtual) addresses in the instructions or in memory are always translated via the segment registers; no direct addressing is permitted.

SUMMARY OF THE INVENTION

The present invention provides a flexible yet inexpensive direct-addressing facility in a data processor where the physical memory size exceeds the capability of the architecture to access all of it at once with a single address register, and to integrate such a facility into a virtual-memory architecture using address-translation registers.

Broadly speaking, the invention uses a prefix register separate from a conventional address register to store both an additional block address portion and a control portion. The value stored in the control portion—preferably a single bit—of the prefix register specifies whether the final memory address is translated normally from the conventional register, or instead is formed from a combination of the conventional register contents and the block portion of the prefix register. Furthermore, a processor having a set of multiple address registers uses a corresponding set of multiple prefix registers. One prefix register associated with each address register, so that the selection of an address register implicitly selects the corresponding prefix register as well.

DESCRIPTION OF A PREFERRED EMBODIMENT

Figure 1:
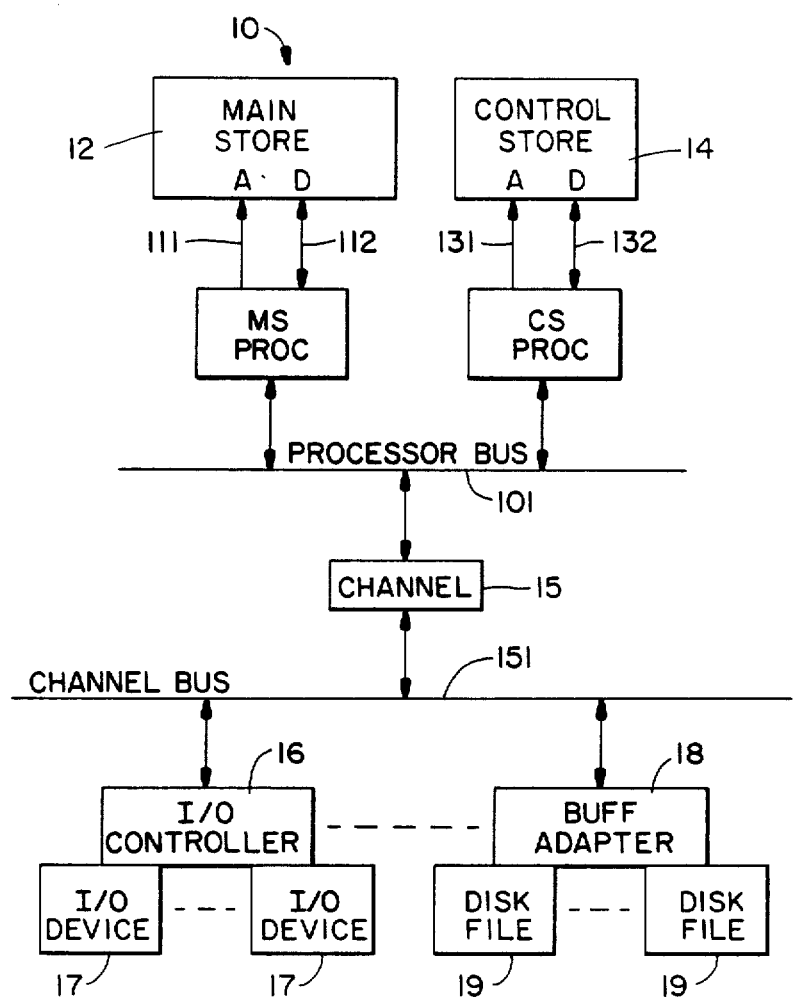
FIG. 1 is a block diagram of a data processor in which the present invention can be implemented.

FIG. 1 shows a representative data processing system 10 in which the invention can be implemented. A main-store processor 11 executes high-level instructions—such as those of the IBM System/34 or a similar instruction set—for applications programs. Read/write main store 12 contains data and instructions for processor 11, and communicates therewith via address lines 111 and bidirectional data lines 112. A control-store processor 13 executes lower-level instructions, such as those found in the IBM System/32, for performing operating-system functions in system 10. Read/write control store 14 contains data and instructions for processor 13, communicating therewith via address lines 131 and data lines 132. Processors 11 and 13 are coupled to each other and to channel controller 15 by processor bus 101. Additional channels can also be accommodated if desired. Channel bus 151 connects to one or more controllers 16 for controlling multiple input/output (I/O) devices 17, such as workstation terminals or printers. I/O controller 16 can itself include a programmable processor and storage, not shown. Another form of controller, buffered adapter 18, can be used to control high-speed devices such as disk drives 19.

A system like system 10 in all relevant respects is shown in U.S. Pat. No. 4,077,060, to R. E. Bodner and R. C. Kiscaden, and in U.S. Pat. No. 4,093,986, to Bodner, Kiscaden, and T. L. Crooks. An I/O controller 16 is shown in copending Application Ser. No. 608,656, filed May 9, 1984 by D. A. Gourneau and S. W. Kerchberger (IBM Docket No. R0983-007). A buffered adapter 18 is shown in copending Application Ser. No. 494,250, filed May 13, 1983 by C. S. Burns et al, now U.S. Pat. No. 4,571,671.

Figure 2:
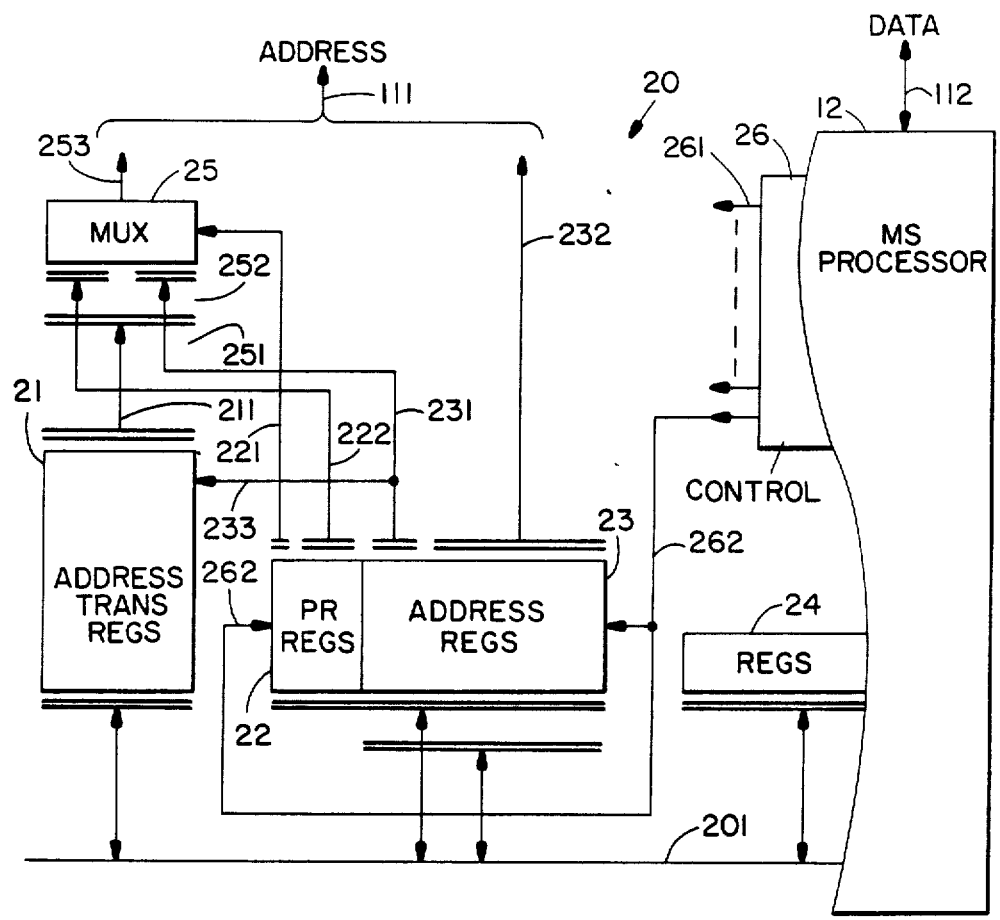
FIG. 2 is a block diagram of the processor of FIG. 1, showing those portions relevant to the invention.

FIG. 2 is a block diagram of that portion 20 of MS processor 12 which is relevant to the present invention. Address lines 111 contains 21 bits, so that two megabytes (2MB) of physical storage 12, FIG. 1 can be addressed. Conventional internal bus 201 writes data to and reads data from a number of registers 21-24 in response to signals 261 from conventional control unit 26, as determined by particular machine states and specific instructions being executed. Conventional control logic 26, corresponding to logic 100 of the aforementioned '060 patent, provides timed control signals 261 to transfer data between common bus 201 and registers 21-24 and to synchronize the transfer of data to unit 25. Block 23 represents a set or bank of address registers which are gated to outputs 231-232 by signal 262 from control unit 26; this is a conventional implementation of the above-mentioned '060 patent, in which one of the registers 23, called an instruction address register (IAR) is gated out by signal 262 during the instruction-fetch machine cycle, other registers 23 called index registers (XR1-XR2) may be specified in an instruction to aid in forming operand addresses during other machine cycles, and so forth. When the term "address register" is used in the singular herein, it refers to that one of the registers 23 which is selected by signal 262. Block 21 represents a bank of 32 address-translation registers (ATRs), also present in the '060 patent. A 5-bit signal 231 derived from address register 23 selects one particular register and gates it to output 211. The registers designated 24 in FIG. 2 are also coupled to bus 201, but perform functions not pertinent to the invention; they correspond to registers 90-94 in FIG. 2a of the '060 patent.

To provide translated addresses consistent with the previous architecture, a full 21-bit real address is composed in the following manner. An instruction supplies a 16-bit virtual or logical address over 16-bit bus 201 to one of the 16-bit address registers 23, or specifies the current contents of one of these registers via signal 262. Lines 232 couple an offset portion, comprising the low-order 11 bits (bits #5-15) of the specified register 23, directly to the low-order 11 positions of final address lines 111. Lines 231 couple a segment portion, comprising the high-order 5 bits (bits #0-4), to the address input of the bank of 32 ATRs 21, each register of which holds a 10-bit page specification. Lines 211 couple the contents of the selected ATR 21 to all 10 bits of switching means or multiplexer 25 via input 251 as a page portion of the final address 111. That is, a translated address is produced by having address register 23 specify a 2KB offset into one of 32 selectable segments distributed arbitrarily within a 2MB total address space.

A bank of prefix registers (PRs) 22 allows the direct formation of real 21-bit addresses into the entire 2MB physical storage space. There are as many PRs 22 as there are address registers 23. These registers, which are not present in the processor of the '060 patent, are loaded from and read to the low-order 6 bits of bus 201, in the same manner as registers 21, 23, and 24. Each PR is associated with one particular address register, because a prefix register is selected from bank 22 by the same signal 262 which selects an address register from bank 23. The contents of the selected register 22 are output to lines 221-222. The singular term "prefix register" or "PR" will refer to that register of bank 22 selected by signal 262. To form a direct address, all 16 bits of address register 23—both the offset and the segment portions of the virtual address—are coupled to the low-order 16 bits (bits #5-20) of final address lines 111: lines 232 are coupled directly to the 11 low-order bits as before, and the 5 high-order bits are coupled via the 5 low-order bits of input 252 of multiplexer 25. The 5 high-order bits of input 252 come from a block portion 222 comprising the 5 low-order bits of the selected 6-bit. prefix register (PR) 22.

Multiplexer 25 selects between the translated address of input 251 and the direct address of input 252 in response to the value of a control portion comprising the highest bit of PR 24, on line 221. A "1" value causes multiplexer 25 to transfer the translated address from input 251 to output 253 to form the 10 high-order bits (#11-20) of storage address lines 111, while a "0" value transfers the 10 high-order bits of the direct address from input 252 to output 253, representing the 10 high-order bits of lines 111. Since each PR 22 is loaded from bus 201 as a single 6-bit quantity, loading a value into that register specifies both whether the address is to be translated or direct, and, if direct, a portion of the address itself.

If the control bit specifies a translated address, the remaining bits—i.e., the block portion—of PR 22 are not used in the present implementation. It is contemplated, however, that these bits could be turned to advantage in providing for multiple banks 5 of ATRs 21. That is, lines 222 could be input to ATR bank 21 along with lines 233 to select the particular ATR to be output to lines 211. This would provide ten bits, allowing the selection of 32 banks of 32 ATRs each, or 1024 ATRs altogether. If the PR registers 22 contain more bits—for example, eight bits each—then more ATRs could be provided, as well as a larger direct address.

The provision of a separate prefix register 22 for every address register 23, and the implicit selection of corresponding prefix and address registers by the same control bit 262, thus enable each address register in the bank of address registers to specify, independently of the others, whether the selected address is translated or direct, and, if direct, to specify the entire real address, even though the address register itself can contain only a part of that address. That is, the bank of PRs 22 in effect extends the bank of address registers 23, but in such a way that the extension or prefix does not require any incompatible modification to the previous architecture. The only modification required is a strict addition—i.e., a superset—comprising another bank of registers constructed and loaded in the same way as the already existing registers.

The concept of the invention is applicable to a wide range of processor architectures, and can be implemented in a variety of technologies. These and other modifications within the scope of the invention will be obvious to those skilled in the art.

We claim as our invention:

1. In a data processor, the combination comprising:
   a memory having an address input for receiving a real address in a real address space;
   a common bus for transferring data to and from a plurality of registers;

address-register means coupled to said common bus for holding a virtual address capable of addressing a virtual address space substantially smaller than said real address space, said virtual address having a segment portion and an offset portion;

a set of address-translation registers for converting said segment portion into a page portion of a real address, said page portion being substantially larger than said segment portion;

prefix-address register means coupled to said common bus for holding a partial direct-address specification having a control portion and a block portion;

switching means responsive to said prefix-address control portion for selectively coupling to a switching-means output either said address-translation registers or said prefix-address block portions along with a portion of said address-register means;

means for coupling to said address input a set of low-order bits comprising said offset portion of said register-address means catenated with a set of high-order bits comprising said switching-means output.

2. The combination of claim 1, wherein said address-register means comprises a bank of individual address registers, wherein said prefix-register means comprises a bank of individual prefix registers, and wherein said processor further includes control means for selecting corresponding ones of said address and prefix registers to provide said offset, segment, block, and control portions.

3. The combination of claim 1, wherein said switching means is further responsive to said prefix-address control portion to couple said segment portion of said virtual-address register to said switching-means output.

4. The combination of claim 3, wherein said switching means is responsive to said prefix-address register control portion to form said real address from said prefix-address register block portion, said address-register segment portion, and said address-register offset portion.

* * * * *